(12) United States Patent
Brewer et al.

(10) Patent No.: US 6,330,245 B1
(45) Date of Patent: Dec. 11, 2001

(54) HUB SYSTEM WITH RING ARBITRATION

(75) Inventors: Steven Brewer, Hertford; Nicholas M. Stapleton, Uxbridge; Christopher A. Walker, Watford, all of (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/207,655

(22) Filed: Dec. 9, 1998

(30) Foreign Application Priority Data

Jun. 5, 1998 (GB) .................................................. 9812081

(51) Int. Cl.[7] .............................. H04L 12/42; G06F 15/16
(52) U.S. Cl. ........................ 370/424; 370/449; 370/452; 370/455; 709/251
(58) Field of Search .................................... 370/389, 400, 370/403, 404, 424, 449, 452, 455, 422, 423, 450; 709/251

(56) References Cited

U.S. PATENT DOCUMENTS

| | | | |
|---|---|---|---|
| 5,053,946 | * 10/1991 | Jain ....................................... | 370/452 |
| 5,070,501 | * 12/1991 | Shimizu ................................ | 370/454 |
| 5,274,637 | * 12/1993 | Sakamura ............................. | 370/455 |
| 5,784,648 | * 7/1998 | Duckwall ............................. | 370/450 |

* cited by examiner

*Primary Examiner*—Alpus H. Hsu
*Assistant Examiner*—Afsar M. Qureshi
(74) *Attorney, Agent, or Firm*—Nixon & Vanderhye P.C.

(57) ABSTRACT

A data network hub unit is stackable with other such units to constitute a hub in which each of the units can supply data packets to network data destinations and receive data packets from network data sources, and to form a closed data transmission ring which enables packets received at any unit to be transmitted from any other unit. The hub unit includes arbitration control means responsive to packet headers circulating on said ring. The arbitration control means is operative: (i) when the hub unit acts a master unit to supply data packets, to modify data packets to provide them each with an arbitration header which includes a grant field, a request priority field, capable of indicating various different level of priority, and a grant priority field; (ii) when the hub unit is acting as the master unit and has no more data packets to supply to the ring, to respond to an arbitration header which has a set priority field by setting the grant field and setting the grant priority field; (iii) when the hub unit is not the master unit but has data packets to place on the ring, to respond to arbitration headers by setting a priority field; and (iv) when the hub unit is not the master unit but has data packets to send, to respond to an arbitration header which has the grant field set and a grant priority field indicating a priority level corresponding to the priority requested by this unit to become the master unit.

19 Claims, 6 Drawing Sheets

HUB SYSTEM WITH RING ARBITRATION

FIELD OF THE INVENTION

This invention relates to stackable hubs for packet-switched communication systems, particularly 'Ethernet' systems. Stackable hubs are composed of a selectable plurality of hub units which can be connected together to form, functionally, a single hub.

BACKGROUND OF THE INVENTION

It is known to connect hubs in a closed system to enable a user to be connected to any unit in the stack and to enable the stack to be managed as a single logical entity. It is necessary to provide some means of arbitration between requests by the units for access to the ring. It is known to provide a ring communication system in which a unit having data to transmit monitors frames circulating on the ring and if a token bit in a frame header indicates that the token is 'free' the unit may transmit and also set the token bit so that other units may not transmit while the unit that has set the token still has 'possession' of the ring. A system of this nature can include a priority indication which prevents the issue of a free token. This inhibition is chiefly intended to allow synchronous data packets to take precedence over asynchronous data packets, as described in U.S. Pat. No. 4,482,999.

BRIEF SUMMARY OF THE INVENTION

The present invention is based on a ring arbitration system in which the arbitration signals, particularly requests for the grant of access, grants of access and indications of priority are inserted in a packet header (particularly an Ethernet packet header) in place of preamble fields in the packet. The system, which preferably includes requests for access and grants for a multiplicity of priority levels and will be described in greater detail below, is capable of providing a fair arbitration for a multiplicity of priority levels for asynchronous data transfer. The system does not use a contentious technique such as collision detection and in its preferred form enables a high utilisation of available bandwidth.

In a preferred form of the invention, a data network hub unit is stackable with other such units, to constitute a hub in which each of the units can supply data packets to network data destinations and receive data packets from network data sources, and to form a closed data transmission ring, which enables packets received at any unit to be transmitted from any other unit. The hub unit includes arbitration control means responsive to packet headers circulating on said ring and the arbitration control means is operative.

(i) when the hub unit acts a master unit to supply data packets, to modify data packets to provide them each with an arbitration header which includes a grant field, a request priority field, capable of indicating various different level of priority, and a grant priority field, (ii) when the hub unit is acting as the master unit and has no more data packets to supply to the ring to respond to an arbitration header which has a set priority field by settling the grant field and setting the grant priority field;

(iii) when the hub unit is not the master unit but has data packets to place on the ring, to respond to arbitration headers by setting a request in a request priority field; and (iv) when the hub unit is not the master unit but has data packets to send, to respond to an arbitration header which has the grant field set and a grant priority field indicating a priority level correspondingly to the priority requested by this unit to become the master unit.

Various features of the invention will be apparent from the following description of a detailed example.

DETAILED DESCRIPTION OF A PREFERRED EMBODIMENT

Figure 1:
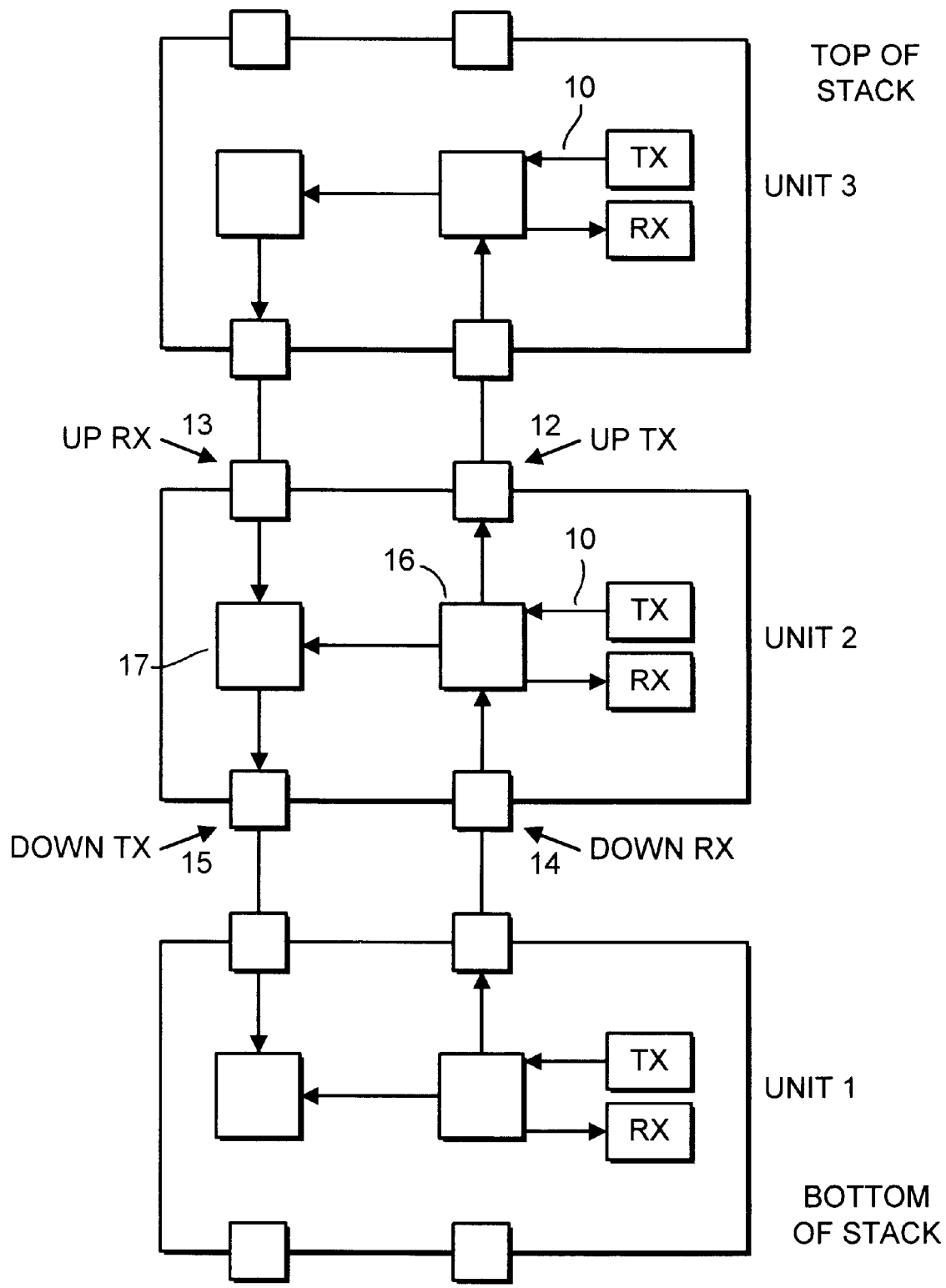
FIG. 1 is a schematic illustration of a stacked hub of which the units are connected in a ring.

FIG. 1 illustrates schematically a stackable hub comprising hub units 1, 2 and 3 There may in this embodiment be up to eight units in the stack. Each unit comprises a transmitting function (Tx), a receiving function (Rx) and, a bus 10, typically a 'SPICE' bus. Such a bus conveys bidirectional eight-bit burst information, equivalent to GMII (Gigabit media independent intertface) data, together with a request/grant mechanism for initiating and terminating the burst transfers. The bus consists of two halves, transmit (Tx) and receive (Rx) and each half consists of eight bits of data and three control lines (Frame, Valid and Grant). It will be understood that each unit is capable of receiving at the Tx function data packets from elsewhere in a network and of transmitting from the Rx function data packets elsewhere in the network. A packet received at any unit may need transmission from any of the other units, so that the units form in essence a single hub (as is generally known in the art).

Each unit comprises (as is shown in relation to unit 2) a pair of 'up' ports 12, 13 and a pair of down ports 14, 15. The up port 12 is connectable to the down port 14, as will be described, by way of a connecting network 16, that allows signals received at the 'down receive' port 14 to pass to the 'up transmit' port 12 or to allow passage of signals from the down receive port to the receiving function (Rx) and the passage of signals from the transmitting function (Tx) to the up transmit port 12. A connecting network 17 enables a connection from the 'up receive' port 13 to the 'down transient' port 15. A selective connection between the networks 16 and 17 (actually part of a comimiotn network) enables the connection of the units 1, 2 and 3 in a ring so that data packets received at one unit from the external network have to traverse the ring, before they can be transmitted from the appropriate unit. Which this is depends on the address data within the packets, as is also known in the art.

Figure 2:
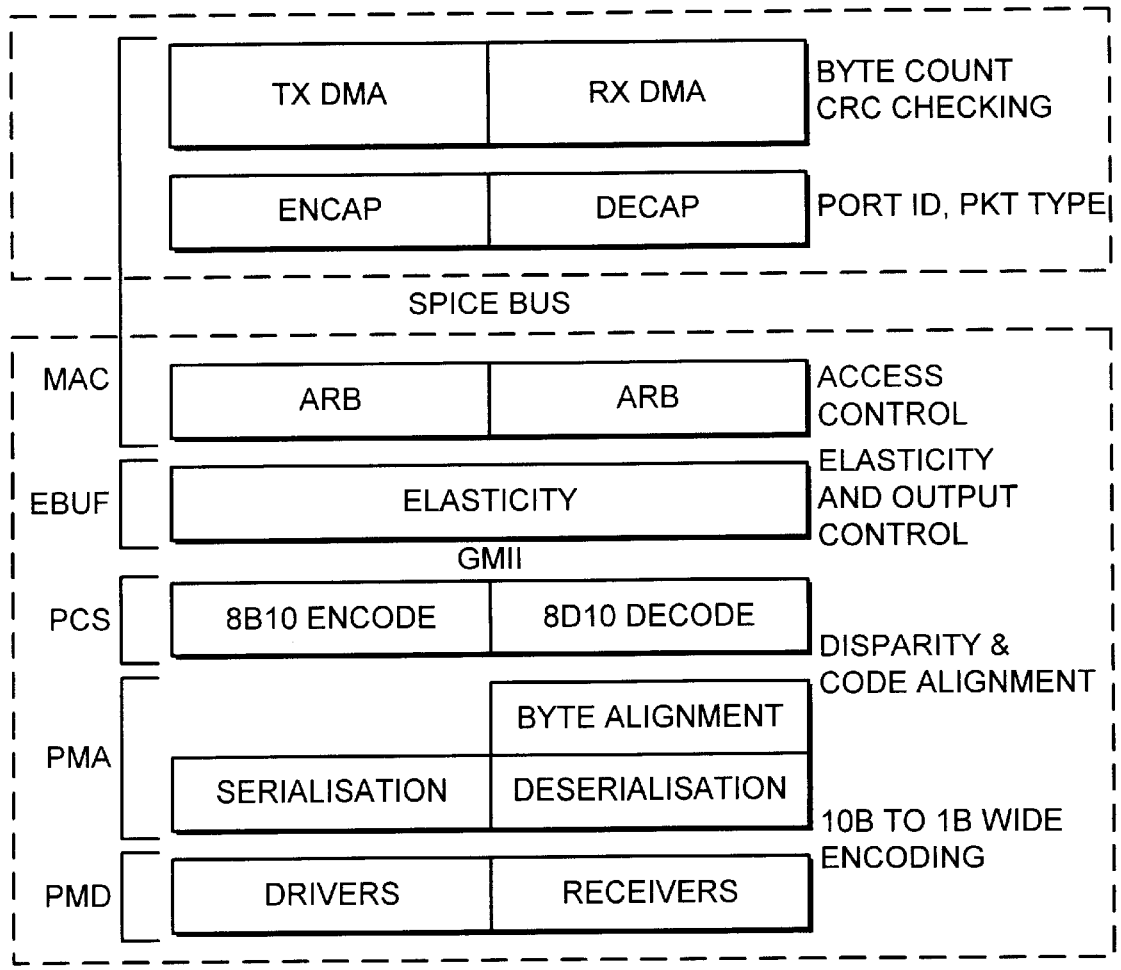
FIG. 2 illustrates a node in the ring.

Architecturally the protocol stack of a unit may be similar to a gigabit Ethernet device. FIG. 2 shows how the different layers sit together and briefly indicates states the function of each sub-layer. The PMA (physical media access) layer and PCS (physical coding sub-) layer may use the gigabit Ethernet PMA and PCS devices. These along with the physical media dependent layer (PMD layer) form the physical layer of the device. In practice the PMD layer comprises gigabit transceivers that attach the PMA layer to the transimission medium, i.e. copper wire or optical fibre. The EBUF (elastic buffer) layer adds the necessary clock domain buffering between Rx (reception) and Tx (transmission), and behaves in a similar manner to a repeater. The arbitration layer maps between an internal GMII and the SPICE bus and runs as described later the arbitration for cascade access. The SPICE bus is a generic DMA bus which allows for request/grant based data transfer between system memory and the chosen network device.

Figure 3:
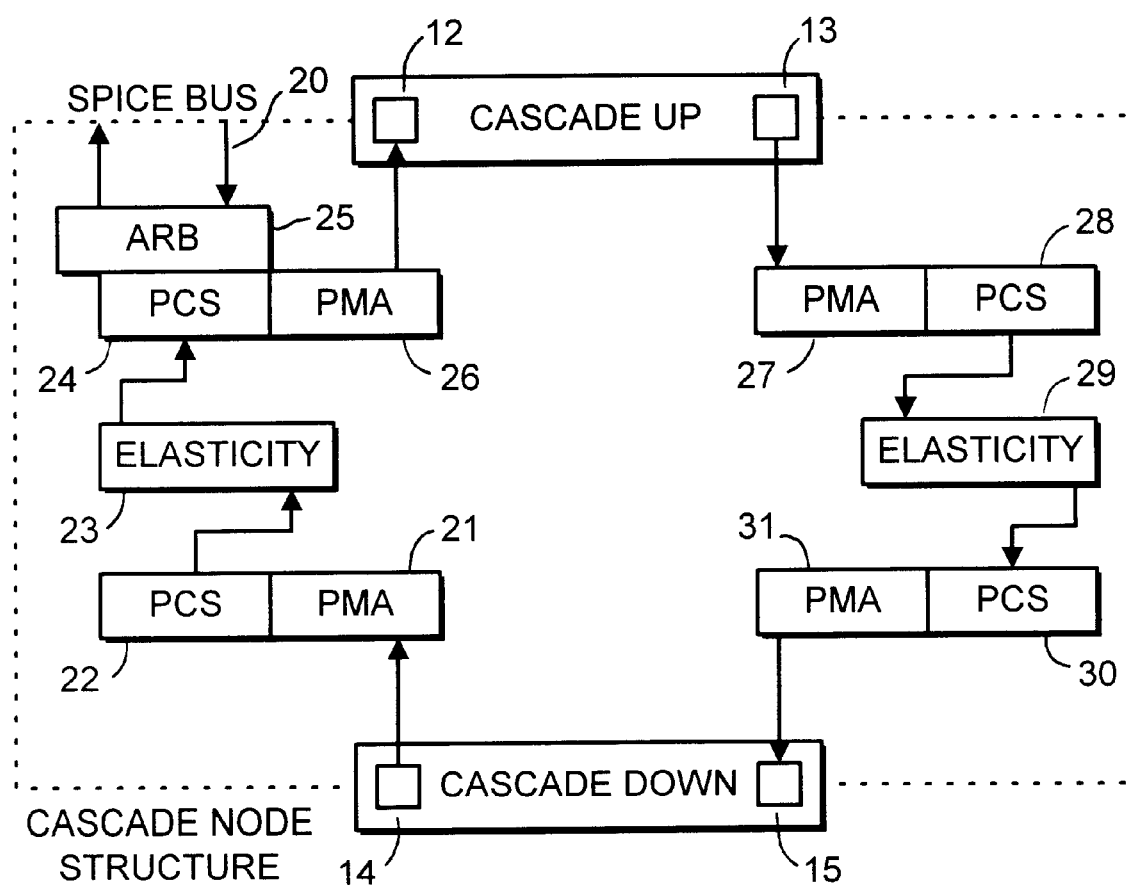
FIG. 3 illustrates the protocol stack of a node.

FIG. 3 shows the structure of a cascade node, i.e. that part of the unit which forms the connection of the unit to the ring. As indicated previously in FIG. 1 there are two paths through the node which means that units stacked form a ring structure. Data which is to be transmitted onto the cascade enters the ring at one point only.

The down receive port 14 is connected to a physical medium attachment layer (PMA) 21 connected by way of a physical coding sub-layer (PCS) 22 to an elasticity layer (i.e. buffer memory) 23, which is connected by way of a physical coding sub-layer 24 and by way of all arbitration layer (AR3) 25 to the bus port 20. The physical coding sub-layer is connected by way of a physical medium attachment layer 26 to the up transmit port 12.

In the down direction, up receive port 13 is connected by way of physical medium attachment layer 27 and physical coding sub-layer 28 to the elasticity layer 29, which is connected by way of the physical coding sub-layer 30 and physical medium attachment layer 31 to the down transmit port 15.

At the top or bottom of a stack a unit is made to detect whether valid data is being received on its up or down ports and if not, data is looped back by means of an internal switch (not shown) which connects the transmit (Tx) path to the receive (Rx) path.

The EBUB (elastic buffer) layer allows for difference in clock domains between the received data rate and the local transmit data rate. It provides a mechanism for inserting and removing 'idles' (i.e. signal groups indicating an idle state) from the ring to prevent progressive clock differences around the ring from causing data corruption due to elastic buffers under or overflowing.

The arbitration layer decides which data is to be sent out on the transmit port. This can either be data read out of the elastic buffer, if the node is not providing data, or data provided by the transmit DMA engine if the node has been granted access to the cascade.

The elastic butter connects the receive and local clock domains using a small FIFO. This may be implemented either as a memory block or as a group of registers. It may be arranged such that each entry in the FIFO is eighteen bits wide and is four entries deep. The eighteen bits can be sub-divided into two nine bit groups. Each group corresponds to an eight bit data symbol, plus the ninth bit which indicates whether the data is real data or whether it is a control symbol.

If the elastic buffer receives a non-data symbol it inserts a known data symbol into the data field indicating whether the symbol was a 'start of packet' symbol (SPD), an 'end of packet' symbol (EPD) or an 'error' symbol.

'Idle' symbols are not inserted into the elastic buffer. It is for each individual node to control how many 'idles' it outputs between packets depending on how full or empty its elastic buffer is.

Insertion and removal of received symbols into the FIFO may be controlled by a Gray-coded write and read pointer respectively. The write pointer may be synchronised to the receive clock supplied by the PCS sub-layer. The read pointer would be synchronous to the local clock.

When a packet is being received from the ring, it is written into the elasticity buffer. When 'Idles' are being received from the ring they are not written into the elasticity buffer.

The packet is forwarded onto the ring (Tx) by reading from the elasticity buffer. This begin only when sufficient words have been written into the elasticity buffer to half fill it, and may continue until the buffer is empty. Once the EBUF is empty 'idles' are forwarded onto the ring until the EBUF is again half full. This effectively allows clock slippage by inserting 'idles' onto the ring or by removing 'idles' from the ring and defines packet boundaries when the buffer is 'empty' In a specific form the buffer is four words deep so that two words have to be written into it before a packet can be forwarded onto the ring. If errors are received during, a packet they may be treated as valid data and passed through the EBUF. For this operation a control bit may be asserted and the data portion of the word may be set to a suitable value to denote an error. Any other event which requires the propagation of control characters around the ring are also written into the elasticity buffer with the control bit asserted and an appropriate control value may be assigned to the data portion of the word. If symbol errors are received during an idle period they may be counted as symbol errors but not written into the elasticity buffer.

Following a reset the pointers should be set so that the elastic buffer is 'empty'. This is achieved by making the read pointer and the write pointer equal. This ensures that 'idles' will be transmitted by the node.

The write pointer should always be incremented unless 'idles' are being received by the physical coding sub-layer.

The read pointer should always be incremented unless the buffer is empty. The read pointer will not start to be incremented until, for the reception of each packet, the distance between the read and write pointer equals two. This is the default distance which would be maintained with exactly equal incoming and local clock frequencies.

The read pointer is incremented before new data is read out of the FIFO

'Idles' may be inserted whenever the elastic buffer is empty or during the period before a packet where the distance between the read and write pointer is less than two.

The interface from the physical control sub-layer maps directly into the elastic buffer. 'Idles' are detected by the FIFO control module which does not then increment the write pointer.

Symbol errors are propagated through the system by the substitution of the code word with a 'void' symbol. These may be counted by the Rx block.

Figure 4:
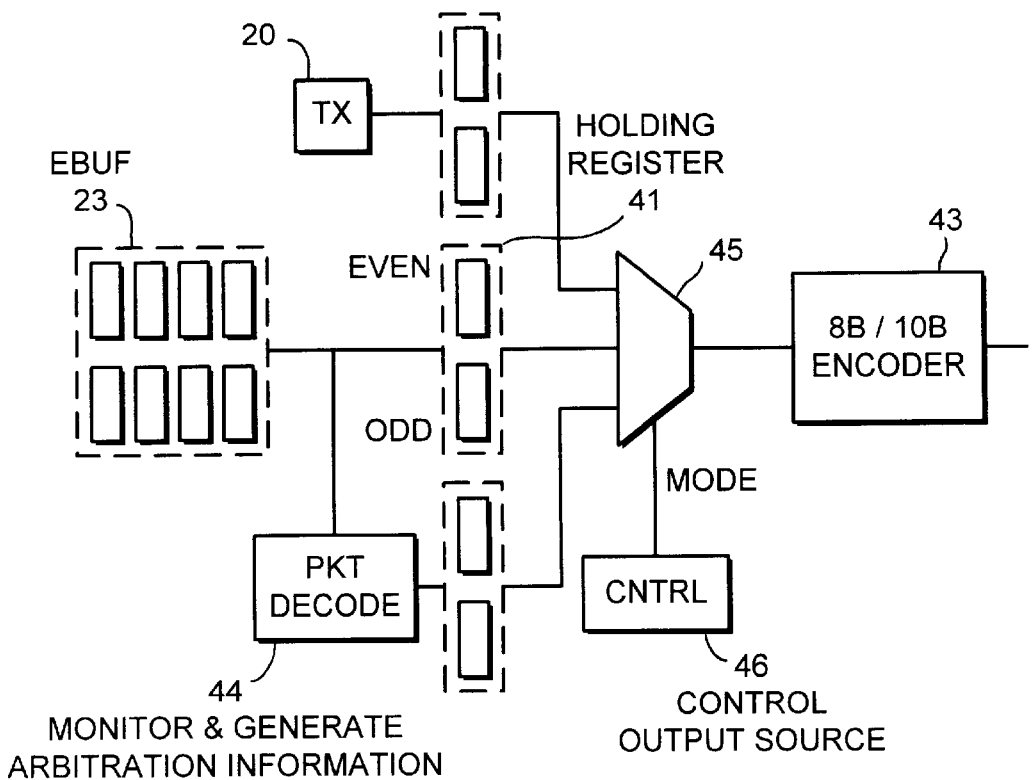
FIG. 4 illustrates an output control system for a unit in the stack.

FIG. 4 illustrates an output control which determines which data should be outputted from the cascade node. It can be in one of two states: 'repeater' and 'master'. When in the 'repeater' state, data is sourced from the elastic buffer 23 only. If this is empty then 'idles' are transmitted. When the mode is the 'master' state, wherein the unit has possession of the ring, data is provided either by the TxFramer/SPICE bus or by the arbitration state machine.

The state of this module depends on the arbitration state machine. A unit can only enter the master state when the unit has been awarded access onto the ring.

As more particularly shown in FIG. 4, packets held in the buffer 23 maybe coupled by way of a holding register 41 and multiplexer 42 to an 8-bit/10-bit encoder 43. Likewise data from the bus 20 or data from a packet decoder 44 (which may monitor and generate arbitration information) may be coupled by way of the holding register and multiplexer 45 to the output encoder. The multiplexer is shown as having a control 46, which is constituted by the arbitration state machine described later.

While in the repeater state a node can modify an incoming arbitration data field if it wants to indicate its desire to become the master.

Various features of the physical coding sub-layer are not directly relevant to the invention, though are in themselves important, such as to maintain the DC balance of the transmitted code words and data alignment. These will not be described in detail.

One function of the physical coding sub-layer is, following the assertion of a 'transmit enable' signal to replace the outgoing preamble word with a special start of packet delimiter (SPD).

Any carrier event which begins with any symbol other than this special delimiter can be considered an error. Furthermore, following the deassertion of the 'transmit enable' signal the PCS appends an end of packet delimiter symbol (EPD) onto the outgoing data stream. On reception of this symbol the PCS replaces this with 'preamble' at the GMII.

The MAC (media access control) layer shown in FIG. 2 performs the following functions (a) creation of the packet format, including the preamble field;

(b) arbitration for access to the medium, and substitution of the preamble field with arbitration information; and (c) CRC (cyclic redundancy code) checking on receive and generation on transmit.

(d) maintaining receive byte count;

(e) extraction of the packet type, RMON (statistical) information and priority; and (f) DMA of packet data to/from system memory (normally random-access memory).

Other functions such as flow control may be provided.

Of these, the one relevant to the invention is arbitration. The relevant functions, i.e. requesting and acknowledging, access requests for the media, are performed by the arbitration sub-layer, which includes the state machine to be described.

There are two processes associated with this layer. Firstly, when a packet is to be transmitted this layer replaces the relevant bits shown in the normal packet header format with arbitration fields. Information such as source box identification, trunking bits etc. is optional, but may be inserted in the preamble field together with the arbitration information. This is then passed through the PCS layer onto the wire. When there is no data to send, and no incoming request. A unit which is the master will send 'null' arbitration frames which it generates by itself, first generating a heading consisting only of an arbitration field and then substituting the preamble with an arbitration field.

Secondly, when receiving packets the incoming arbitration information is removed and replaced with preamble data before being forwarded to the SPICE bus. The manner of reception of packets is not directly important to the invention and will not be described in detail.

Figure 5:
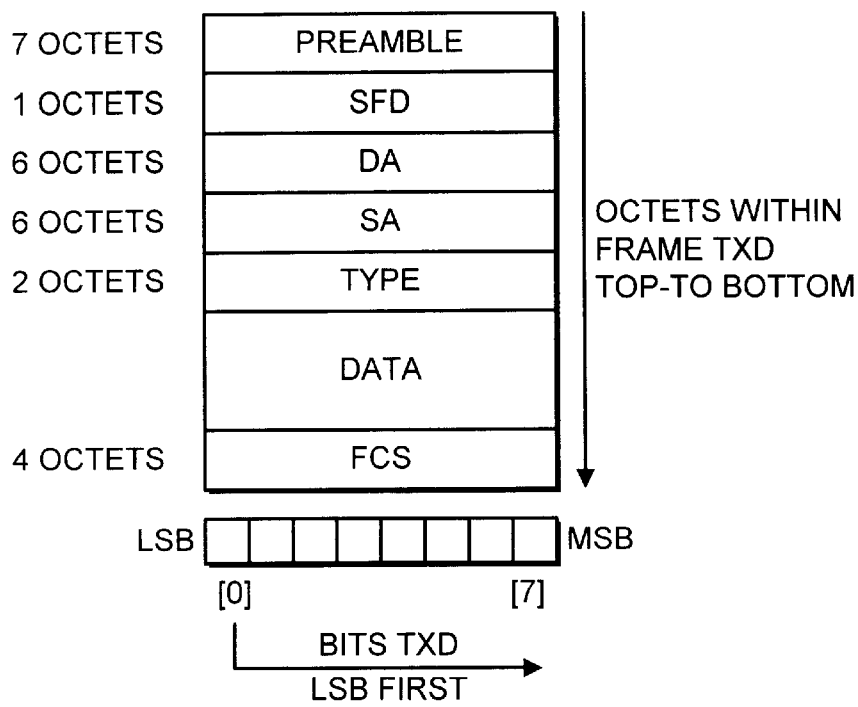
FIG. 5 illustrates a transmission format of an ordinary data packet for use in the data transmission system of which the hub would form a part.

FIG. 5 shows a normal data packet format. It comprises a preamble of seven octets, a start of frame delimiter (SFD), 'frame' in this case referring to the data portion of the packet excluding the preamble, the destination address (DA), a source address (SA), two octets indicating the type of data packet, data octets and four FCS octets. FCS stands for frame checksum, i.e. a cyclic redundancy code checksum for the purpose of allowing detection and possibly correction of bit errors. A data packet is not required to have a fixed length for the present invention although the external network may require the packets to be a fixed length (e.g. 64 octets).

Figure 6:
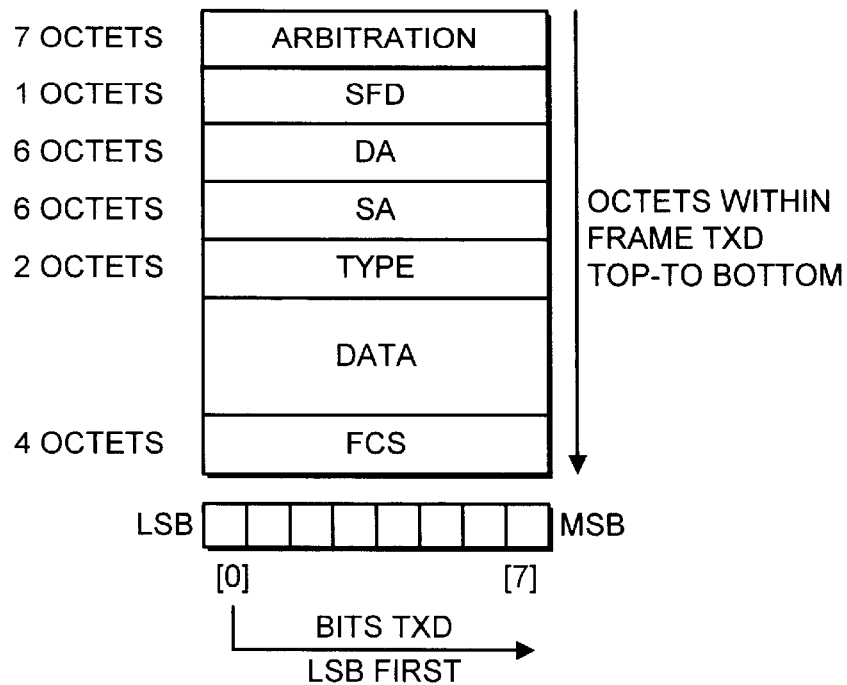
FIG. 6 illustrates a modified packet including an arbitration header according to the invention.
Figure 7:
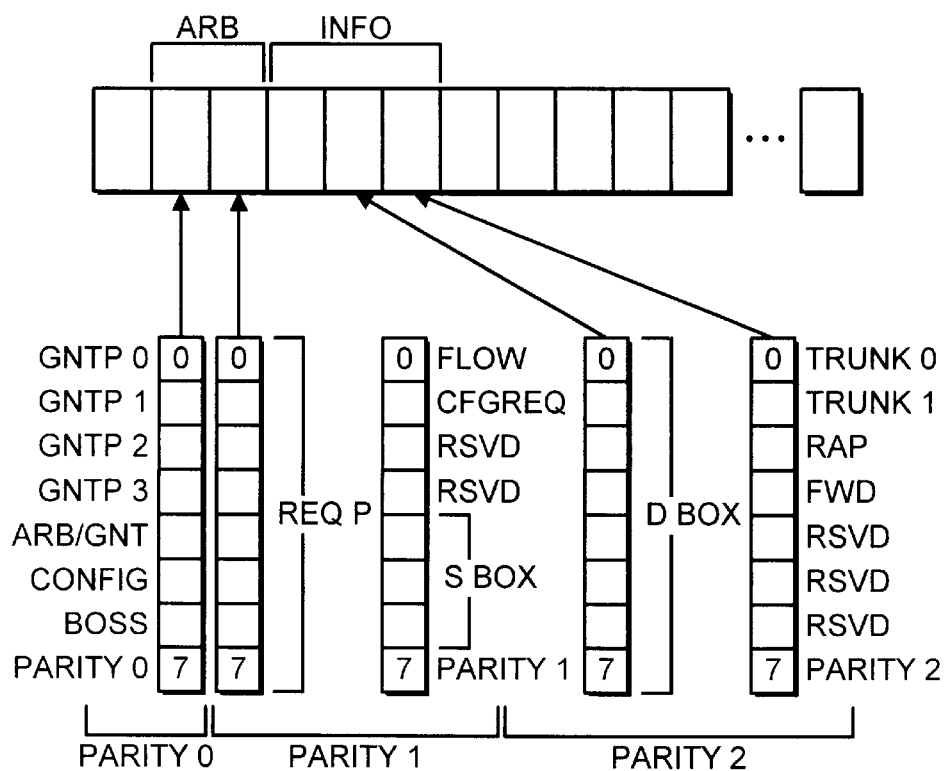
FIG. 7 illustrates mainly the arbitration header of a modified packet.

FIGS. 6 and 7 shown the format of a data packet modified according to the invention for transmission on the ring. FIG. 6 shows that the preamble of the normal packet format has been removed and a arbitration header (of the same size) has been inserted. FIG. 7 shows mostly the arbitration header and the allotted fields in it. The octet P represents an unmodified preamble.

The meaning of the various functions, and bits, and groups shown in FIG. 7 is as follows:

'Arb' is a one bit field indicating that the header is an arbitration header.

'Gnt' is a one-bit field indicating that the header is an arbitration grant header. This means that the recipient has been granted the token, i.e. granted access to the ring (if the recipient's priority matches the granted priority).

It should be understood that in this embodiment Arb and Gnt are mutually exclusive and are constituted by the same one-bit field, which takes the vale 0 for an arbitration header and the value 1 for an arbitration grant header.

'Gnt P [3:0]' is a four bit field indicating the encoded value of the current priority being granted, e.g. 6.

'Req P [7:0]' is an eight bit field of which each bit is an individual request for a respective level of priority.

'Flow' is a one-bit field denoting a 'super' priority packet used for flow control.

'Boss' is a one-bit field having a special function desirable for correcting error. All units transmit data with this bit set to 0. The unit at the bottom of the stack unit sets this bit to a 1 whenever a packet is repeated to it This enables fast error recovery.

'Dbox' is a destination box mask. It can support multi-casts and hence needs to be a bit mask. It can be used for address learning within a stack of packet switching hubs. In such a case the arbitration layer checks this bit mask against its current unit number (within the stack) to determine whether to forward the packet across the SPICE bus.

'Sbox' is an encoded source box number indicating the specific unit number (within a stack) from which the packet originated. It may be used for unit address learning within the stack.

'Config' This bit denotes a configuration packet which may be used in a reconfiguration of the stack of units.

'RAP' is a field used to indicate that this packet is destined for an RMON analysis port somewhere within the stack.

'Fwd' is a one bit field used with the RAP bit to indicate when a RAP packet is destined for both the RAP port and another port on the unit containing the analysis port. With this bit cleared, the look-up on a unit will be by-passed.

'Trunk [1:0]' is a two bit field used for port trunking. It identifies the trunk to which a packet belong.

The three immediately foregoing fields need not be used for the specified purposes, and may be used instead to convey supplementary information or flags that may be useful for communication between hubs.

'Parity' refers to the two one-bit fields used for error checking, of the arbitration fields. There is one parity bit per word of header data.

'Rsvd' denotes a reserved bit for future use. It will be set to 0 and is included in parity checking.

The arbitration mechanism provides for fair access to the ring for all nodes connected to it. Fairness is maintained between nodes waiting to transmit packets of equal priority, such that they will be serviced in a round robin fashion. If a unit has highest priority packets to send, the only traffic seen on the cascade should be that high priority traffic.

Arbitration information is circulated around the ring via the arbitration packet header. Preferably the ring supports eight levels of priority. These are communicated using the ReqP bits. A further level of priority is supported for flow control packets. This is necessary as flow control must stop the activity on the as soon as practically possible, because the presence of flow control packets on the ring means that a unit is about to start dropping packets.

A unit which has become the master has control of all packets set onto the network. It prefaces its data with an arbitration header, which replaces the preamble data sent by the MAC layer. A master transmits onto the ring an arbitration header with the priority level equal to the priority mask field contained in the grant header it received to become the master with its priority level cleared. This maintains the fairness of access between nodes of different priority levels.

The master then examines the received arbitration header. If any bits are set then the current master unit knows that another unit wishes to send a packet.

The master unit decodes the returned arbitration field during transmission of its current packet. Thus the impact of performing, arbitration on the network throughput is very low. As soon as the master has finished transmitting its frame, it sends an arbitration grant frame, i.e. a frame including an arbitration header in which the one-bit rant field Gnt is set. The header will have the grant priority field set to the priority indicated in the request priority field that the master received. Thus access to ring for the transmission of packet is granted to the unit nearest (in the direction of transmission around the ring) the master and has a request priority which corresponds to the granted priority.

A master unit which receives an invalid header will generate a new arbitration header.

When a unit wants to become the master, it modifies the incoming arbitration data, setting the arbitration request bit which indicates its desired level of priority. A unit will only do this if the incoming priority level bit corresponding to its desired level is 'clear'. Thus a node requesting a level 5 priority transmission will only assert the priority bit 5 of the incoming arbitration field corresponding to priority level is set to 0. Once a unit has managed to set this bit, it continues to set this bit in any future arbitration headers received.

A unit becomes the master of the ring, only after the proper ring access protocol has been followed. The unit must have successfully set an incoming arbitration priority bit. The unit continues to set this arbitration priority bit in any further arbitration headers received. The unit then monitors the ring looking, for arbitration grant headers. The GNT_P (Grant Priority) field of this header will indicate the priority level being acknowledged. The unit then removes the arbitration header from its outgoing stream, replacing it with idles, and becomes the master. It stores the value of the Request Priority bit mask received in the Grant header.

The priority level of a new arbitration frame will depend upon the stored level of the previous request bit in the rant which enabled this unit to become the master. If any bits were set, then the unit sends an arbitration frame with the bits set. This prevents other low priority requests from being serviced and maintains fairness between the low priority stations After reception of a valid grant header the node becomes the bus owner and controls further arbitration.

Once a node has entered the 'WAIT_GNT' arbitration state, as explained later with reference to the state machine, it will always set the relevant priority bit in any further arbitration headers that the node sees. This will ensure correct operation following reconfiguration or following bit errors.

Figure 8:
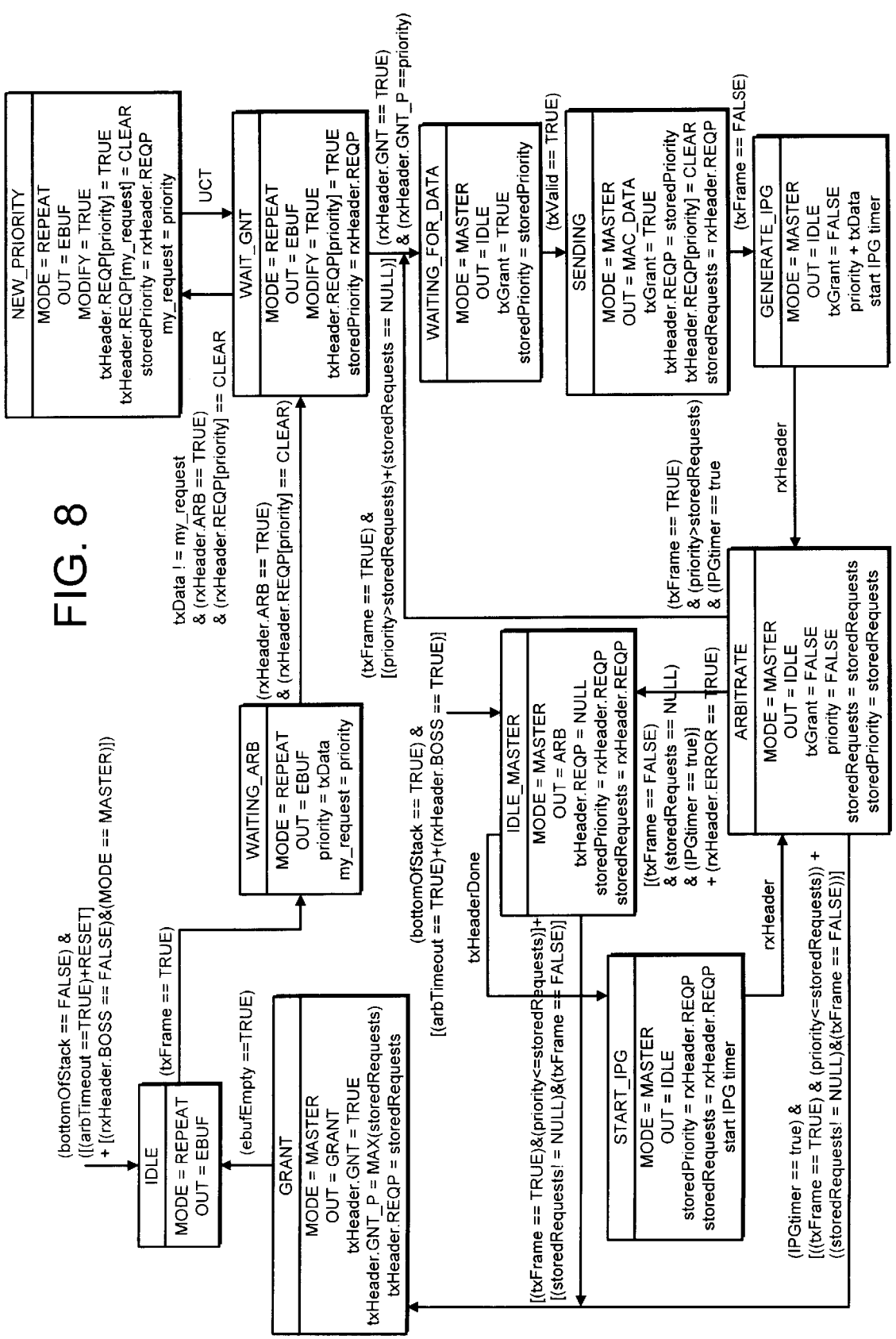
FIG. 8 illustrates a state machine which controls the operation of a unit in respect of the arbitration process.

FIG. 8 illustrates a state machine which responds to the various arbitration signals and controls the operation of the respective unit.

All signals apart from timeless signals, are assumed to be set to 'false' unless specified within a state. A timeless signal is neither true or false when not active.

Explanation of Terms in the State Machine rxHeader. is a timeless signal which is asserted when an arbitration or grant header is received.

rxHeader .ERROR indicates that an arbitration header was received but it contained a symbol or parity error.

rxHeader .REQP denotes a request priority levels indicated in an arbitration or grant header It is not asserted if there are any errors within the header.

rxHeader .ARB indicates that the received header is an arbitration header. It is not asserted if there are any errors within the header.

rxHeader .BOSS indicates that the 'BOSS' bit of the received arbitration header was set. It is It is not asserted if there are any errors within the header rxHeader .GNT indicates that the received header was a grant header. It is not asserted if there are any errors within the header.

rxHeader .GNT_P is the Hex value of the priority level of a grant header which is being granted. It is not asserted if there are any errors within the header.

txHeader represents values to be substituted or generated in any outgoing header forwarding or transmission.

txheader .REQP indicates the request priority.

txHeader .ARB indicates that the header is an arbitration header.

txHeader .BOSS sets the 'BOSS' bit in outgoing frames.

txHeader .SBOX represents the source box value in outgoing frame headers.

txHeader .GNT is the granted value of priority in an arbitration grant header. It has no meaning in a normal arbitration.

txHeader .GNT_P is the value of priority to grant access to next.

txHeaderDONE is a signal which asserts only in the IDLE_MASTER state when the arbiter has finished generating the ARB header. It indicates the end of packet and the start of IDLE.

txFrame represents a SPICE bus transmit request txGrant represents a SPICE bus transmit grant output from the arbitration layer, in response to a txFrame request.

txValid is a SPICE bus transmit data valid signal, which is required owing to the delay between the assertion of a txFrame request, the detection of a txGrant and the transmission of valid data.

txData represents SPICE bus transient data.

priority is the value of SPICE bus priority as indicated by the value of txData prior to a packet transfer.

storedRequests represents the stored value of the received ReqP bits during arbitration processing and is used to generate a grant frame.

storedPriority represents the stored value of the ReqP bits when a unit node was granted mastership of the cascade. It is used to generate the arbitration frame sent by a master before its data packet.

ebufEmpty is a signal from the elastic buffer that is asserted when there is no data contained within the buffer.

MODE indicates what state the node is in.

MASTER indicates the mastership of the ring, the unit placing data onto the ring and stripping incoming data.

REPEAT indicates that the unit will merely forward data received from the upstream port.

OUT controls where data is being sourced from on the output cascade port

IDLE means that the unit is sending a constant idle signal.

EBUF indicates the repeating data from the EBUF (if this is empty then idles shall be sent).

MAC_DATA denotes that data is being received from the SPICE bus (txData).

ARB indicates the generation of arbitration headers and idles.

GRANT indicates the generation of grant headers and idles.

MODIFY indicates, if 'TRUE' that the value of outgoing arbitration headers will be changed. If it is 'FALSE', it is an instruction not to alter arbitration/grant headers passing through.

MAXO is the return hex count of the most significant bit set within a bit mask, e.g. MAX(8'b10001000)=7.

Explanations of the Different States and Their Transitions

IDLE is the default power-on state of a unit which has not determined that it is the bottom of the stack. In this state, it is in the 'repeat' mode, transmitting any elastic buffer data out or, if this is empty, generating idle symbols. The idle state is exited on the assertion of the txFrame SPICE bus signal. This indicates that a source wishes to send a packet onto the cascade.

WAIT_ARB represents the state in which the unit is waiting for the receipt of a valid, non-errored arbitration header. The priority level of the SPICE bus request is indicated by the value of the SPICE bus txData. The unit continues to forward all received data, unmodified. If the incoming arbitration header's ReqP bit corresponding to the SPICE bus priority level is cleared, then the unit will leave this state and will enter the WAIT_GNT state. If the bit is set, then the unit remains in this state until the request is removed, or until the necessary arbitration header is received.

WAIT_GNT represent the state in which the unit modifies the outgoing arbitration header, such that the ReqP bit for the SPICE bus priority is set (i.e. ReqP[priority]=TRUE). Any further arbitration headers which circulate on the ring have this bit set (in case of error conditions where the arbitration header has been corrupted or lost). The unit continues to provide data from its elastic buffer, only modifying the headers of packets as required. On receipt of a valid grant header, in which the value of the grant priority (GNT_P) is equal to the SPICE bus priority, then the node has effectively been granted access to the cascade, and the node will now become the master. The node should not forward this grant header. Hence the GNT_P bits must be within the first word of the header.

The values of the ReqP bits within the grant header are stored, so that the priority settings can be maintained when the unit begin the arbitration process.

WAITING_FOR_DATA indicates that the unit has now become the ring master. It is now placing idle symbols onto the ring, awaiting the reception of valid data from the SPICE bus. The unit does not forward any packets received into its elastic buffer. On the assertion of the SPICE bus txValid signal, the unit moves into the 'sending' state.

SENDING indicates that the node is the master and begins forwarding data received on the SPICE bus txData lines. The preamble field of the SPICE bus txData is substituted by the arbitration header and the relevant bits are set by the arbitration sub-layer as required. The ReqP bits are set equal to the priority level stored from the grant header received in the WAIT_GNT state, except for the REQP [priority] bit which is cleared. This allows other units on the ring requesting access with the same priority as the master to be serviced next in accordance with the round robin arbitration mechanism.

When the SPICE bus data has ended, the txFrame signal will be deasserted. This will cause the node to exit to the GENERATE_IPG state.

GENERATE_IPG initiates the generation of IDLEs on the medium, following a packet transmission, and starts an 'IPG timer' in order to ensure that sufficient IDLEs are generated to constitute a suitable inter-packet gap. In addition it allows the current master unit time to register another txFrame Request which may be of higher priority than the current pending request returned in the rxHeader REQP filed, thus ensuring that priority is maintained on the ring, all pending packets of a given priority being sent before any packet of a lower priority can be sent. The unit enters the ARBITRATE state following reception of the rxHeader (i e. the arbitration header of the packet that this unit has just sent).

ARBITRATE denotes the state in which the unit examines the requests received within its circulated arbitration header and the level of any requests on the SPICE bus and determines which priority level to grant. If the received ReqP bits indicate a higher level priority than the indicated level on the SPICE bus then the node will grant access to another node by entering the 'grant' state. If there are no requests indicated in the ReqP bits, and there is no request on the SPICE bus, then the node enters the IDLE_MASTER state. If the priority of a request on the SPICE bus is higher than any received requests in the ReqP bits then the node will remain the master for a further packet transmission. The ReqP bits are stored in the storePriority bits and the node transitions into the WAITING_FOR_DATA state.

IDLE_MASTER denotes the state that is entered when there is no current request pending, either on the ring or on the SPICE bus. In this state the master unit is responsible for keeping arbitration active by sourcing an arbitration header onto the ring, with no priority bits set. During this state it will also monitor for the return of its arbitration header. If a request is received the unit will transfer the value of the ReqP bits to the stored priority register. When it has finished sourcing the arbitration header it again enters the ARBITRATE state. While there are no active requests pending either on the medium or the SPICE bus the unit will cycle around these three states.

GRANT denotes the state in which the master unit transmits a grant header, setting the ReqP priority bits equal to the store Requests value. If the value of the GNT_P field is set to the level of the highest REQP bit set within the storedRequests field. For example if ReqP is equal to 8'b1001100, then the GNT_P field is set to the hex value 3'h6.

The unit waits for all packet activity on the ring to stop (just idles circulating) before transitioning to the 'idle' state. This is detected by the elastic buffer being signalled as empty.

This action prevents the unit from forwarding any data fragments contained within its elastic buffer.

Error Conditions

The system needs to be able to cope with the loss of the arbitration packet at any point in the cycle. This could be due to the removal of a unit from the stack, powering down or noise interference causing bit errors. As the current master unit should continue to provide arbitration headers even when it has no more packets to send, there should always be activity oil the network.

Each unit may include a timer which is reset upon the reception of a valid start of frame symbol. If this timer exceeds TBD value then the variable arbTimeout shall be asserted.

If a given unit sees the assertion of arbTimeout and it is acting as if it is the bottom unit in a stack, then the unit shall become the stack's master unit. In so doing, the unit will send out a 'null' arbitration header followed immediately by a frame if it has a packet awaiting transmission. This will restart negotiations for access to the ring. A unit which has previously managed to set a request bit in an arbitration header will continue to set this bit in any circulating arbitration header.

An errored arbitration header should not cause the arb-Timer to be reset, nor shall a grant header.

If due to errors or misconfiguration two masters become active in the ring, then a recovery mechanism is required to restore order as both of these will be removing data from the network.

A unit which is a master should never receive a grant signal. If it does receive a grant signal then one of two conditions can exist:

(a) the unit which was being granted access has been removed; or (b) there are multiple masters.

A master unit which is not the bottom of a stack always expects to see a '1' in the 'boss' bit. If this is not seen then the node leaves the master state and switches into repeater mode, forwarding received traffic. This ensures that the unit closest to the bottom of the stack remains the only master in the ring.

Hence, if a master unit receives a valid grant signal, it shall leave the master state. This will restart the arbitration process as if there is now no master the arbTimeout will expire, promoting the bottom unit in the stack to the master state.

If a grant frame was to be corrupted to a valid arbitration frame and hence there was no master in the ring, then potentially there is a lock-up condition as this header will continue to circulate forever.

The 'boss' bit within the first byte of the arbitration header is set on all packet headers repeated by the unit at the bottom of the stack. Packets are always transmitted with this bit set to zero.

If a bottom of a stack unit ever sees this bit set then it knows that this header has circulated around the ring, twice. On seeing this error condition this box becomes the master unit and strips off the incoming packet. Its behavior is the same as if it had just been granted access, i.e providing arbitration nulls and granting arbitration requests.

Any bit errors within an arbitration or grant header will be recorded either as a symbol, disparity or parity error. This will result in the assertion of the rxHeader.ERROR signal. The SPICE bus interface should ensure that the remainder of any packet received with a symbol, disparity or parity error is corrupted in some way as to guarantee a CRC error (as per RMII specification).

Flow control is an important part of a switch device using full duplex links. The cascade needs flow control to prevent a unit being flooded with traffic from a second unit. Within the ring there are multiple end stations. This means that sending a flow control packet will cause all end stations to stop sending resulting in no packet throughput on the cascade. In order for flow control to work, the time between a unit requesting to send a flow control packet and the time when it takes effect needs to be bounded. To ensure this remains bounded, a unit requesting to send a flow control packet will use the special priority bit (FLOW) which indicates the highest level of priority on the ring. This guarantees that a flow control frame will be the next frame transmitted onto the cascade. The act of sending a flow control packet will in itself guarantee some level of flow control, as there can only be one packet on the cascade at a time.

We claim:

1. A data network hub comprising a plurality of hub units each connected to supply data packets to network data destinations and receive data packets from network data sources, said hub including a closed data transmission ring which enables packets received at any unit to be transmitted from any other unit and wherein:

(i) each hub unit includes means for supplying data to said ring and for receiving data from the ring and means for controlling access to the ring for the supplying of packets to (ii) a unit which is acting as a master unit, supplying packets to the ring, replaces fields in the headers of said packets with arbitration fields, said arbitration fields including a request field and a grant field, (iii) the master unit responds, when it has no more packets to supply to the ring and it receives by way of said ring a packet header which has a request field set, to set said grant field;

(iv) a unit which is not the master and has data to place on the ring responds to a packet header received by way of said ring to modify the header to set a request field; and (v) a unit which is not the master and has data to place on the ring responds to a packet header which has the grant field set to become the master unit to provide data packets to said ring.

2. A hub according to claim 1 wherein a unit responds to packets received from the ring to remove said arbitration fields from the packets and to insert preamble fields in place of the removed arbitration fields.

3. A hub according to claim 1 wherein said request field defines various levels of priority and wherein:

the master unit sets a grant priority field in a header indicating grant of access; and a unit having data to place on the ring responds to a grant field which is set to become the master if the grant priority corresponds to the request priority of the unit.

4. A data network hub unit which is stackable with other such units to constitute a hub in which each of the units can supply data packets to network data destinations and receive data packets from network data sources, and to form a closed data transmission ring which enables packets received at any unit to be transmitted from any other unit, the hub unit including arbitration control means responsive to packet headers circulating on said ring, wherein the arbitration control means is operative:

(i) when the hub unit acts a master unit to supply data packets, to modify data packets to provide them each with an arbitration header which includes a grant field, a request priority field, capable of indicating various different levels of priority, and a grant priority field;

(ii) when the hub unit is acting as a master unit and has no more data packets to supply to the ring, to respond to an arbitration header which has a set priority field by setting the grant field and setting the grant priority field;

(iii) when the hub unit is not the master unit but has data packets to place on the ring, to respond to arbitration headers by setting a priority field; and (iv) when the hub unit is not the master unit but has data packets to send, to respond to an arbitration header which has the grant field set and a grant priority field indicating a priority level corresponding to the priority requested by this unit to become the master unit.

5. A hub unit according to claim 4 wherein a master unit sets a grant priority field according to the priority requested in an arbitration header received by the master unit.

6. A method of controlling data transmission on a closed unidirectional ring which connects a multiplicity of stacked hub units which can each supply data packets to network data destinations and receive data packets from network data sources, the ring enabling packets received at any hub unit to be transmitted from any other hub unit and each hub unit including arbitration control means responsive to packet headers circulating on said ring, wherein the method comprises:

(i) when a hub unit is acting a master unit to supply data packets, modifying data packets to provide them each with an arbitration header which includes a grant field, a request priority field, capable of indicating various different levels of priority, and a grant priority field;

(ii) when a hub unit is acting as the master unit and has no more data packets to supply to the ring, responding to an arbitration header which has a set priority field by setting the grant field and setting the grant priority field;

(iii) when a hub unit is not the master unit but has data packets to place on the ring, responding to arbitration headers by setting a priority field; and (iv) when a hub unit is not the master unit but has data packets to send, responding to an arbitration header which has the grant field set and a grant priority field indicating a priority level corresponding to the priority requested by this unit to become the master unit.

7. A method according to claim 6, including setting a grant priority field according to the priority requested in an arbitration header received by the master unit.

8. A hub according to claim 3, wherein the master unit sets said grant priority field in accordance with a priority in the request field of a packets header received by the master unit.

9. A hub according to claim 3, wherein the master unit supplies said arbitration fields to the ring until it receives said packet header having said request field set.

10. A data network unit which is stackable with other such units to form a closed data transmission ring which enables packets received at any unit to be transmitted from any other unit, the unit including arbitration control means responsive to packet headers circulating on said ring, wherein the arbitration control means is operative:

(i) when the unit acts a master unit, to enable the unit to supply data packets to said ring and to place on the ring arbitration headers;

(ii) when the unit is acting as a master unit and has no more data packets to supply to the ring, to respond to an arbitration header having a valid request field to provide an arbitration grant header including a grant priority field;

(iii) when the unit is not the master unit but has data packets to place on the ring, to respond to an arbitration header by setting a request field therein; and (iv) when the unit is not the master unit but has data packets to send, to respond to an arbitration grant header having a grant priority field corresponding to a priority requested by this unit to cause the unit to become the master unit.

11. A data network unit according to claim 10, wherein said arbitration control means sets a grant priority field according to said priority requested in an arbitration header received by the master unit.

12. A data network unit which is stackable with other such units to form a closed data transmission ring which enables packets received at any unit to be transmitted from any other unit, the unit including arbitration control means responsive to packet headers circulating on said ring, wherein the arbitration control means is operative:

(i) when the unit acts a master unit, to enable the unit to supply data packets to said ring and to place on the ring arbitration headers, each arbitration header including a grant field and at least one priority field;

(ii) when the unit is acting as a master unit and has no more data packets to supply to the ring, to respond to an arbitration header having a valid request field to provide an arbitration grant header by setting said grant field and setting a priority field to indicate a grant priority;

(iii) when the unit is not the master unit but has data packets to place on the ring, to respond to an arbitration header to set a priority field to indicate a request priority therein; and (iv) when the unit is not the master unit and has data packets to place on the ring, to respond to an arbitration grant header having a grant priority field corresponding to a priority requested by this unit to cause the unit to become the master unit.

13. A data network unit according to claim 12, wherein the arbitration control means sets said grant priority in accordance with a request priority in a received arbitration header.

14. A data network unit according to claim 12, wherein the arbitration control means is selectively operative to set a predetermined field in an arbitration header to detect an error condition on receipt of an arbitration header having the predetermined field set.

15. A data network unit according to claim 12, wherein the arbitration control means provides said arbitration fields by modifying preamble fields in Ethernet data packets.

16. A data network unit according to claim 12, wherein said grant field denotes an arbitration grant header and an arbitration header according as it is set and not set respectively.

17. In a packet switched communication system having a plurality of data network hub units forming a closed data transmission ring for communicating data packets among said hub units, a method of processing arbitration requests comprising:

providing an arbitration control means for each hub unit;

enabling a hub unit to supply the data packets to the transmission ring and to place arbitration headers on the transmission ring when the hub unit acts a master unit;

enabling a hub unit to respond to an arbitration header having a valid request field to provide an arbitration grant header including a grant priority field when the hub unit is acting as a master unit and has no more data packets to supply to the transmission ring;

enabling a hub unit to respond to an arbitration header by setting a request field therein when the hub unit is not the master unit but has data packets to place on the ring; and enabling a hub unit to respond to an arbitration grant header having a grant priority field corresponding to a priority requested by the hub unit to cause the hub unit to become the master unit when the hub unit is not the master unit but has data packets to send.

18. In a packet switched communication system having a plurality of data network hub units forming a closed data transmission ring for communicating data packets among said hub units, a system for processing arbitration requests comprising:

- means for providing an arbitration control means for each hub unit;
- means for enabling a hub unit to supply data packets to said ring and to place on the ring arbitration headers when the hub unit acts a master unit;
- means for enabling a hub unit to respond to an arbitration header having a valid request field to provide an arbitration grant header including a grant priority field when the hub unit is acting as a master unit and has no more data packets to supply to the transmission ring;
- means for enabling a hub unit to respond to an arbitration header by setting a request field therein when the hub unit is not the master unit but has data packets to place on the ring; and
- means for enabling a hub unit to respond to an arbitration grant header having a grant priority field corresponding to a priority requested by the hub unit to cause the unit to become the master unit when the hub unit is not the master unit but has data packets to send.

19. A communications network, comprising:

- a plurality of data network units to form a closed data transmission ring for enabling communication of data packets among the data network units; and
- each data network unit including arbitration control means responsive to packet headers circulating on said ring; and wherein the arbitration control means operates (i) to enable a hub unit to supply data packets to said ring and to place on the ring arbitration headers when the hub unit acts a master unit;

(ii) to enable a hub unit to respond to an arbitration header having a valid request field to provide an arbitration grant header including a grant priority field when the hub unit is acting as a master unit and has no more data packets to supply to the ring;

(iii) to enable a hub unit to respond to an arbitration header by setting a request field therein when the hub unit is not the master unit but has data packets to place on the ring; and (iv) to enable a hub unit to respond to an arbitration grant header having a grant priority field corresponding to a priority requested by the hub unit to cause the hub unit to become the master unit when the hub unit is not the master unit but has data packets to send.

* * * * *

UNITED STATES PATENT AND TRADEMARK OFFICE
CERTIFICATE OF CORRECTION

PATENT NO. : 6,330,245 B1  
DATED : December 11, 2001  
INVENTOR(S) : Brewer et al.

Page 1 of 1

It is certified that error appears in the above-identified patent and that said Letters Patent is hereby corrected as shown below:

<u>Column 12,</u>  
Line 21, after "to" insert -- the ring --.

Signed and Sealed this

Thirtieth Day of April, 2002

Attest:

JAMES E. ROGAN  
*Director of the United States Patent and Trademark Office*

*Attesting Officer*